United States Patent
Xu

(10) Patent No.: US 11,069,048 B2
(45) Date of Patent: Jul. 20, 2021

(54) SYSTEM AND METHOD FOR FACILITATING EFFICIENT DAMAGE ASSESSMENTS

(71) Applicant: Alibaba Group Holding Limited, Grand Cayman (KY)

(72) Inventor: Juan Xu, Beijing (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 103 days.

(21) Appl. No.: 16/563,634

(22) Filed: Sep. 6, 2019

(65) Prior Publication Data

US 2020/0090321 A1 Mar. 19, 2020

(30) Foreign Application Priority Data

Sep. 7, 2018 (CN) .......................... 201811046061.6

(51) Int. Cl.
| | | |
|---|---|---|
| *G06T 7/00* | (2017.01) | |
| *G06K 9/62* | (2006.01) | |
| *G06T 7/70* | (2017.01) | |
| *G06N 3/08* | (2006.01) | |

(52) U.S. Cl.
CPC .......... *G06T 7/0002* (2013.01); *G06K 9/6257* (2013.01); *G06K 9/6267* (2013.01); *G06N 3/08* (2013.01); *G06T 7/70* (2017.01); *G06K 2209/21* (2013.01); *G06K 2209/23* (2013.01);
(Continued)

(58) Field of Classification Search
None
See application file for complete search history.

(56) References Cited

U.S. PATENT DOCUMENTS

| | | |
|---|---|---|
| 8,180,629 B2 | 5/2012 | Rehberg |
| 9,607,138 B1 | 3/2017 | Baldwin |
| 2001/0046659 A1 | 11/2001 | Oster |
| 2009/0206993 A1 | 8/2009 | Di Mambro |
| 2013/0015946 A1 | 1/2013 | Lau |

(Continued)

FOREIGN PATENT DOCUMENTS

| | | |
|---|---|---|
| WO | 2017059576 | 4/2017 |
| WO | 2018055340 | 3/2018 |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 9813OU-9813OU, XP060063208, paragraph [0001]; figure 1.
(Continued)

*Primary Examiner* — Justin P. Misleh
(74) *Attorney, Agent, or Firm* — Shun Yao; Park, Vaughan, Fleming & Dowler LLP.

(57) ABSTRACT

Embodiments described herein provide a system for facilitating image sampling for training a target detector. During operation, the system obtains a first image depicting a first target. Here, the continuous part of the first target in the first image is labeled and enclosed in a target bounding box. The system then generates a set of positive image samples from an area of the first image enclosed by the target bounding box. A respective positive image sample includes at least a part of the first target. The system can train the target detector with the set of positive image samples to detect a second target from a second image. The target detector can be an artificial intelligence (AI) model capable of detecting an object.

18 Claims, 10 Drawing Sheets

(52) U.S. Cl.
CPC ............... *G06T 2207/20081* (2013.01); *G06T 2207/20084* (2013.01); *G06T 2207/30248* (2013.01)

(56) References Cited

U.S. PATENT DOCUMENTS

| | | |
|---|---|---|
| 2013/0208103 A1 | 8/2013 | Sands |
| 2014/0037184 A1 | 2/2014 | Gorski |
| 2014/0270411 A1 | 9/2014 | Shu |
| 2015/0110364 A1 | 4/2015 | Niinuma |
| 2015/0110366 A1 | 4/2015 | Sezille |
| 2015/0341370 A1 | 11/2015 | Khan |
| 2016/0034786 A1 | 2/2016 | Suri |
| 2016/0063235 A1 | 3/2016 | Tussy |
| 2016/0283787 A1 | 9/2016 | Nepomniachtchi |
| 2016/0307029 A1 | 10/2016 | Vaknin |
| 2017/0048244 A1 | 2/2017 | Loughlin-McHugh |
| 2017/0060867 A1 | 3/2017 | Moutinho |
| 2017/0061563 A1 | 3/2017 | Falkenstern |
| 2018/0083973 A1 | 3/2018 | Paraskevas |
| 2018/0300576 A1* | 10/2018 | Dalyac ................. G06K 9/6218 |
| 2019/0073641 A1* | 3/2019 | Utke .................. G06K 9/00624 |
| 2020/0051237 A1* | 2/2020 | Spivey .................... E21B 12/02 |

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.

* cited by examiner

SYSTEM AND METHOD FOR FACILITATING EFFICIENT DAMAGE ASSESSMENTS

RELATED APPLICATION

Under 35 U.S.C. 119, this application claims the benefit and right of priority of Chinese Patent Application No. 201811046061.6, filed 7 Sep. 2018.

BACKGROUND

Field

This disclosure is generally related to the field of artificial intelligence. More specifically, this disclosure is related to a system and method for facilitating efficient indexing in a database system.

Related Art

In conventional a damage assessment technique, a vehicle insurance company may send a professional claim adjuster to the location of a damaged vehicle to conduct a manual survey and damage assessment. The survey and damage assessment conducted by the adjuster can include determining a repair solution, estimating an indemnity, taking photographs of the vehicle, and archiving the photographs for subsequent assessment of the damage by a damage inspector at the vehicle insurance company. Since the survey and subsequent damage assessment are performed manually, an insurance claim may require a significant number of days to resolve. Such delays in the processing time can lead to poor user experience with the vehicle insurance company. Furthermore, the manual assessments may also incur a large cost (e.g., labor, training, licensing, etc.).

To address this issue, some vehicle insurance companies use image-based artificial intelligence (AI) models (e.g., machine-learning-based techniques) for assessing vehicle damages. Since the AI models may automatically detect the damages on a vehicle based on images, the automated assessment technique can shorten the wait time and reduce labor costs. For example, an AI-based assessment technique can be used for automatic identification of the damage of the vehicle (e.g., the parts of the vehicle). Typically, a user can capture a set of images of the vehicle depicting the damages from the user's location, such as the user's home or work, and send the images to the insurance company (e.g., using an app or a web interface). These images can be used by an AI model to identify the damage on the vehicle. In this way, the automated assessment process may reduce the labor costs for a vehicle insurance company and improve user experience associated the claim processing.

Even though automation has brought many desirable features to a damage assessment system, many problems remain unsolved in universal damage detection (e.g., independent of the damaged parts).

SUMMARY

Embodiments described herein provide a system for facilitating image sampling for training a target detector. During operation, the system obtains a first image depicting a first target. Here, the continuous part of the first target in the first image is labeled and enclosed in a target bounding box. The system then generates a set of positive image samples from an area of the first image enclosed by the target bounding box. A respective positive image sample includes at least a part of the first target. The system can train the target detector with the set of positive image samples to detect a second target from a second image. The target detector can be an artificial intelligence (AI) model capable of detecting an object.

In a variation on this embodiment, the first and second targets indicate a first and second vehicular damages, respectively. The label of the continuous part indicate a material impacted by the first vehicular damage.

In a further variation, the system detects the second target by detecting the second vehicular damage based on a corresponding material independent of identifying a part of a vehicle impacted by the second vehicular damage.

In a variation on this embodiment, the system generates the set of positive image samples by determining a region proposal in the area of the first image enclosed by the target bounding box and selecting the region proposal as a positive sample if an overlapping parameter of the region proposal is in a threshold range.

In a further variation, the overlapping parameter is a ratio of an overlapping region and a surrounding region of the region proposal. The overlapping region indicates a common region covered by both the region proposal and a set of internal bounding boxes within the target bounding box. A respective internal bounding box can include at least a part of the continuous region. The surrounding region indicates a total region covered by the region proposal and the set of internal bounding boxes In a further variation, the system selects the set of internal bounding boxes based on one of an intersection with the region proposal, a distance from the region proposal, and a total number of internal bounding boxes in the target bounding box.

In a further variation, the system generates a negative sample, which excludes any part of the first target, from the first image. To do so, the system can select the region proposal as the negative sample in response to determining that the overlapping parameter of the region proposal is in a low threshold range. The system may also select an area outside of the target bounding box in the first image as the negative sample In a further variation, the system determines a set of subsequent region proposals in the area of the first image enclosed by the target bounding box. To do so, the system can apply a movement rule to a previous region proposal and terminate based on a termination condition.

In a variation on this embodiment, the system generates a second set of positive image samples. To do so, the system can select a positive image sample from a region proposal in a second target bounding box in the first image. The system may also change the size or shape of a bounding box of a region proposal of a previous round.

In a variation on this embodiment, the system optimizes the training of the target detector by generating a plurality of bounding boxes for a plurality of image samples in the set of positive image samples and combining the plurality of bounding boxes to generate a combined bounding box and a corresponding label. Here, a respective bounding box identifies the corresponding part of the continuous region.

BRIEF DESCRIPTION OF THE FIGURES

In the figures, like reference numerals refer to the same figure elements.

DETAILED DESCRIPTION

Figure 1A:
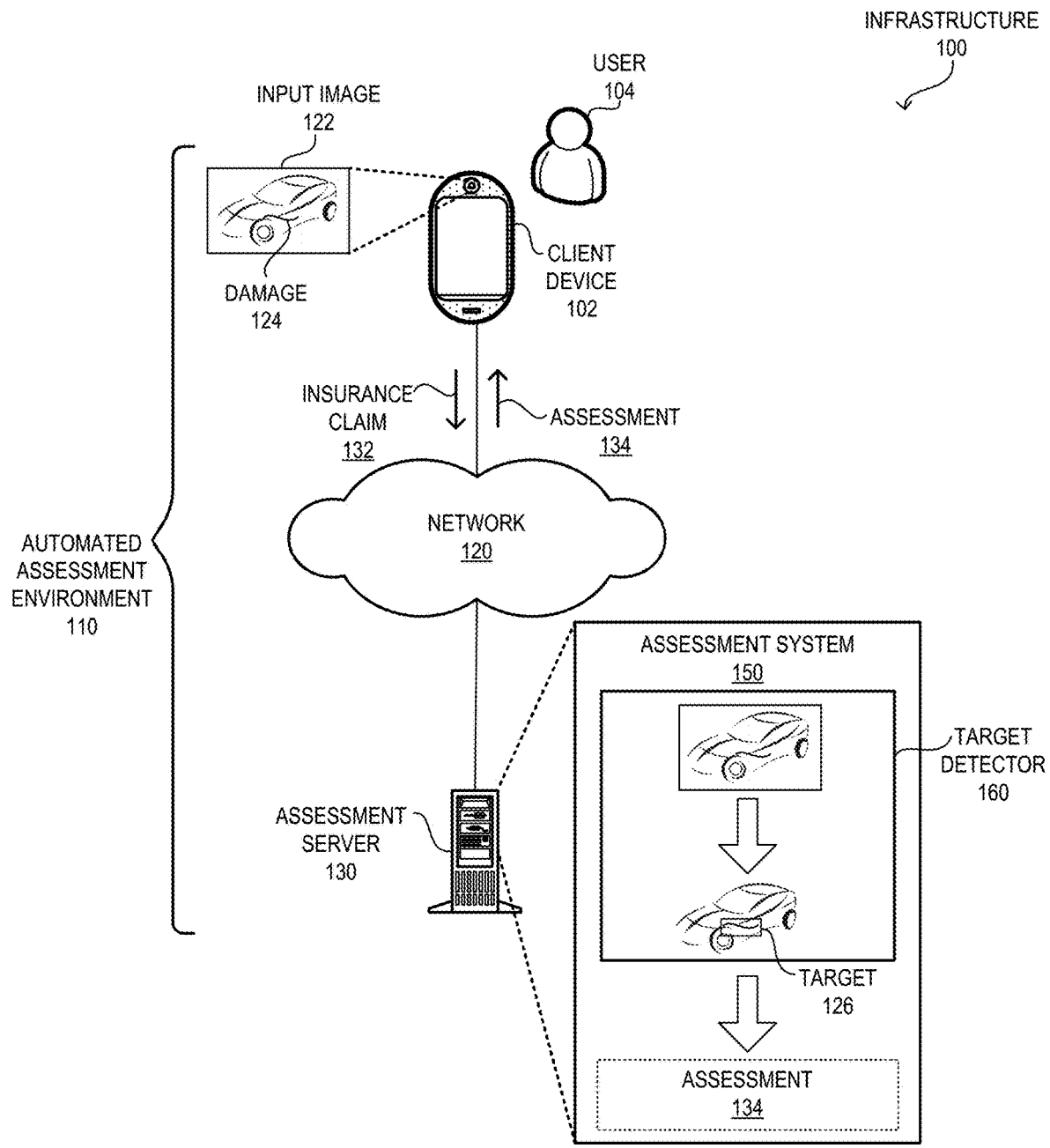
FIG. 1A illustrates exemplary infrastructure and environment facilitating an efficient assessment system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently detecting a damage of a vehicle by (i) generating positive and negative image samples from a labeled image for training a target detection system; and (ii) integrating detection results of multiple image samples associated with a damage to increase the efficiency of the target detection system. In this way, an assessment system can use the target detection system to identify damages on a vehicle independent of the damaged parts and generate a repair plan based on the identification.

With existing technologies, an AI-based technique for determining vehicular damages from an image may include determining the damaged parts of a vehicle and the degree of the damages based on the similar images in historical image data. Another technique may involve identifying the area of a damaged part in the center of an input image through an identification method and comparing the area of the part with the historical image data to obtain a similar image. By comparing the obtained image with the input image, the technique may determine the degree of damages. However, these techniques are prone to interference from the additional information of the damaged part in the input image, a reflection of light, contaminants, etc. As a result, these techniques may operate with low accuracy while determining the degree of damages.

For example, for identifying damages on a vehicle using target detection, the technique typically needs to be trained with a certain number of positive samples and negative samples. Here, a certain number of images depicting the damages need to serve as the positive samples, and a certain number of images not depicting the damages need to serve as the negative samples. However, obtaining positive samples in sufficient numbers can be challenging. Furthermore, a negative sample may include at least a segment of a damaged part and cause interference in the training process. As a result, the AI-based model may not be equipped to detect damages on a part of a vehicle, especially if the model has not been trained with similar damages on the part of the vehicle.

To solve this problem, embodiments described herein provide an assessment system that can identify a damaged area of a vehicle (i.e., a target) from one or more images of the vehicle and assess the degree of damage on the identified damaged area. The system can assess damage to a vehicle in two dimensions. The system can identify a part of the vehicle based on object detection in one dimension and determine the damage in another dimension. To determine the damage, the system can identify the damaged area based on the material on which the damage has been inflicted. Hence, the system can execute the damage detection independent of the underlying vehicle part. This allows the system to efficiently detect a damaged area on a vehicle without relying on how that damaged area may appear on a specific part of the vehicle.

To do so, the system can identify damages and the degree of damages on materials, such as the paint surface, plastic components, frosted components, glasses, lights, mirrors, etc., without requiring information of the underlying parts. As a result, the system can also be used for the identification of damages on similar materials in other scenarios (i.e., other than the damages on a vehicle). On the other hand, the system can independently identify one or more parts that may represent the damaged area. In this way, the system can identify the damaged area and the degree of damages, and the parts that construct the damaged area. Based on the damage information, the system then performs a damage assessment, determines a repair plan, and generates a cost estimate. For example, the system can estimate the cost and/or availability of the parts, determine whether a repair or replacement is needed based the degree of damage, determine the deductibles and fees, and schedule a repair operation based on calendar information of a repair shop.

However, the target detector (e.g., a deep-learning network) can operate with high accuracy if the target detector is trained with sufficient number of positive and negative samples. In some embodiments, the system can also generate image samples from labeled images (e.g., images with labeled targets). A labeled image may at least include a target bounding box that can be hand-labeled in advance and a plurality of internal bounding boxes in the target bounding box. The target bounding box is used for surrounding a continuous region of a target (e.g., the largest continuous region of damage), and each of the plurality of internal bounding boxes surrounds a segment of the continuous region of the target.

During operation, the system can obtain the labeled images and determine region proposals for sampling in the target bounding box. The region proposal can be represented based on a pre-determined bounding box (e.g., with predetermined size and shape). This bounding box can be placed in the target bounding box based on a sliding window or an image segmentation algorithm. The system then compares the region proposal with the corresponding internal bounding boxes to determine overlapping parameters.

Based on whether the overlapping parameters are in a threshold range, the system may collect the region proposal as a positive sample for training the target detector. Otherwise, if the overlapping parameters are below a low threshold range, the system may collect the region proposal as a negative sample. In addition, the system can also collect negative samples from outside of the target bounding box to ensure that the negative sample does not include any damage information. In this way, the system can reduce interference and improve the accuracy of the target detector.

Exemplary System

FIG. 1A illustrates exemplary infrastructure and environment facilitating an efficient assessment system, in accordance with an embodiment of the present application. In this example, an infrastructure 100 can include an automated assessment environment 110. Environment 110 can facilitate automated damage assessment in a distributed environment. Environment 110 can serve a client device 102 using an assessment server 130. Server 130 can communicate with client device 102 via a network 120 (e.g., a local or a wide area network, such as the Internet). Server 130 can include components such as a number of central processing unit (CPU) cores, a system memory (e.g., a dual in-line memory module), a network interface card (NIC), and a number of storage devices/disks. Server 130 can run a database system (e.g., a database management system (DBMS)) for maintaining database instances.

Suppose that a user 104 needs to file an insurance claim regarding damage 124 on a vehicle. If the insurance company deploys an AI-based technique for automatically determining damages from an image, user 104 may use client device 102 to capture an image 122 depicting damage 124. User 104 can then send an insurance claim 132 comprising image 122 as an input image from client device 102 via network 120. With existing technologies, the AI-based technique may determine the parts damaged by damage 124 and the degree of damage 124 based on the similar images in historical image data. Another technique may involve identifying the area of damage 124 in the center of input image 122 through an identification method and comparing the area of damage 124 with the historical image data to obtain a similar image. By comparing the obtained image with input image 122, the technique may determine the degree of damages.

However, these techniques are prone to interference from the additional information in input image 122, such as undamaged segments, a reflection of light, contaminants, etc. As a result, these techniques may operate with low accuracy while determining the degree of damages. Furthermore, these techniques typically need to be trained with a certain number of positive samples and negative samples. However, obtaining positive samples in sufficient numbers can be challenging. Furthermore, a negative sample may include interfering elements. As a result, the AI-based technique may not be equipped to detect damage 124, especially if the technique has not been trained with damages similar to damage 124.

To solve these problems, an automated assessment system 150 can efficiently and accurately identify the area and vehicle parts impacted by damage 124 (i.e., one or more targets) from image 122, and assess the degree of damage 124. System 150 can run on server 130 and communicate with client device 102 via network 120. In some embodiments, system 150 includes a target detector 160 that can assess damage 124 in two dimensions. Target detector 160 can identify a part of the vehicle impacted by damage 124 in one dimension and determine damage 124 in another dimension. Upon determining the damage, target detector 160 can apply geometric calculation and division to determine the degree of damage 124 as target 126 that can include the location of damage 124, the parts impacted by damage 124, and the degree of damage 124.

Furthermore, target detector 160 can identify the area or location of damage 124 based on the material on which the damage has been inflicted. As a result, target detector 160 can execute the damage detection independent of the underlying vehicle part. This allows target detector 160 to efficiently detect the area or location of damage 124 without relying on how that damaged area may appear on a specific part of the vehicle. In other words, target detector 160 can identify damage 124 and the degree of damage 124 on the material on which damage 124 appears without requiring information of the underlying parts. In addition, target detector 160 can independently identify one or more parts that may be impacted by damage 124. In this way, target detector 160 can identify the area and the degree of damage 124, and the parts impacted by damage 124.

Based on the damage information generated by target detector 160, system 150 then generates a damage assessment 134 to determine a repair plan and generate a cost estimate for user 102. System 150 can estimate the cost and/or availability of the parts impacted by damage 124, determine whether a repair or replacement is needed based the degree of damage 124, and schedule a repair operation based on calendar information of a repair shop. System 150 can then send assessment 134 to client device 102 via network 120.

Examples of target detector 160 include, but are not limited to, Faster Region-Convolutional Neural Network (R-CNN), You Only Look Once (YOLO), Single Shot MultiBox Detector (SSD), R-CNN, Lighthead R-CNN, and RetinaNet. In some embodiments, target detector 160 can reside on client device 102. Target detector 160 can then use a mobile end target detection technique, such as MobileNet+SSD.

Figure 1B:
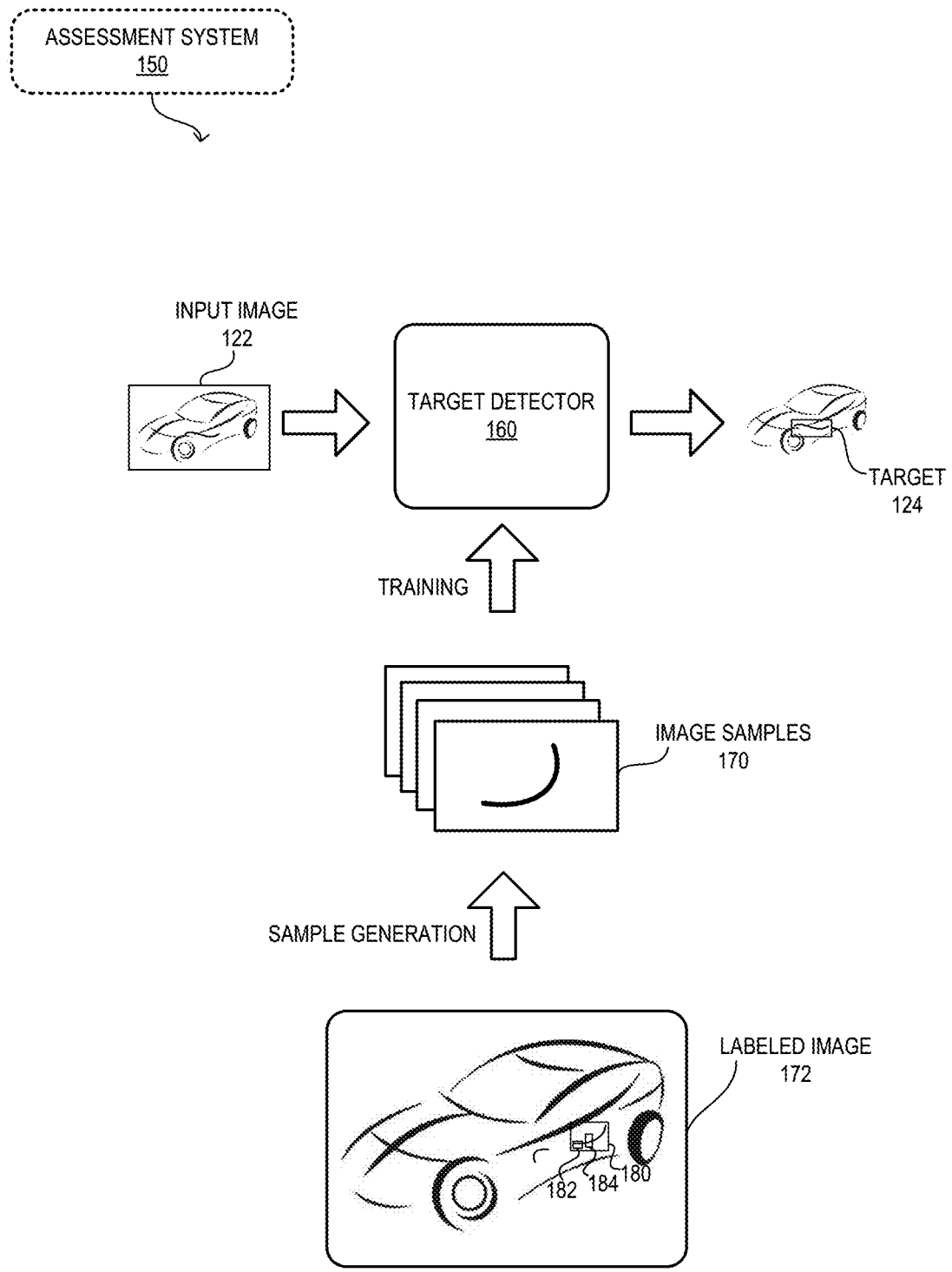
FIG. 1B illustrates exemplary training and operation of an efficient assessment system, in accordance with an embodiment of the present application.

FIG. 1B illustrates exemplary training and operation of an efficient assessment system, in accordance with an embodiment of the present application. Target detector 160 can operate with high accuracy if target detector 160 is trained with sufficient number of positive and negative samples. In some embodiments, system 150 can also generate image samples 170 from a labeled image 172, which can be an image with labeled targets. It should be noted that the image sampling and target detection can be executed on the same or different devices. Labeled image 172 may at least include a target bounding box 180 that can be hand-labeled in advance and a plurality of internal bounding boxes 182 and 184 in target bounding box 180. Target bounding box 180 is used for surrounding a continuous region of a target (e.g., the largest continuous region of damage), and each of internal bounding boxes 182 and 184 surrounds a segment of the continuous region of the target.

The labeling of on image 172 can indicate a damage definition, which can include the area and the class, associated with a respective continuous damage segment depicted in image 172. The various degrees of damages corresponding to the various materials are defined as the damage classes. For example, if the material is glass, the damage class can include minor scratches, major scratches, glass cracks, etc. The smallest area that includes a continuous segment of the damage is defined as the area of the damage segment. Therefore, for each continuous segment of the damage in image 172, the labeling can indicate the area and the class of the damage segment. Upon determining the damage definition of a respective damage segment, the labeling can indicate the damaged definition of the corresponding damage segment. With such labeling of a damage segment, the damage becomes related only to the material and not to a specific part.

During operation, system 150 can obtain labeled image 172 and determine region proposals for sampling in target bounding box 180. The region proposal can be represented based on a pre-determined bounding box (e.g., with predetermined size and shape). The bounding box of the region proposal can be placed in target bounding box 180 based on a sliding window or an image segmentation algorithm. System 150 then compares the region proposal with the corresponding internal bounding boxes to determine overlapping parameters (e.g., an intersection over union (IoU)). System 150 may only compare the region proposal with the internal bounding boxes that are within a distance threshold of the region proposal (e.g., 50 pixels) or have an intersection with the region proposal.

Based on whether the overlapping parameters are in a threshold range (e.g., greater than 0.7 or falls within 0.7-0.99), system 150 may collect the region proposal as a positive sample for training target detector 160. Otherwise, if the overlapping parameters are below a low threshold range (e.g., less than 0.1), system 150 may collect the region proposal as a negative sample. In addition, system 150 can also collect negative samples from outside of target bounding box 180 to ensure that the negative sample does not include any damage information. In this way, system 150 can generate image samples 170 that can include accurate positive and negative samples. By training object detector 160 using image samples 170, system 150 can reduce the interference and improve the accuracy of target detector 160, thereby allowing target detector 160 to accurately detect target 124 from input image 122.

Image Sampling

Figure 2:
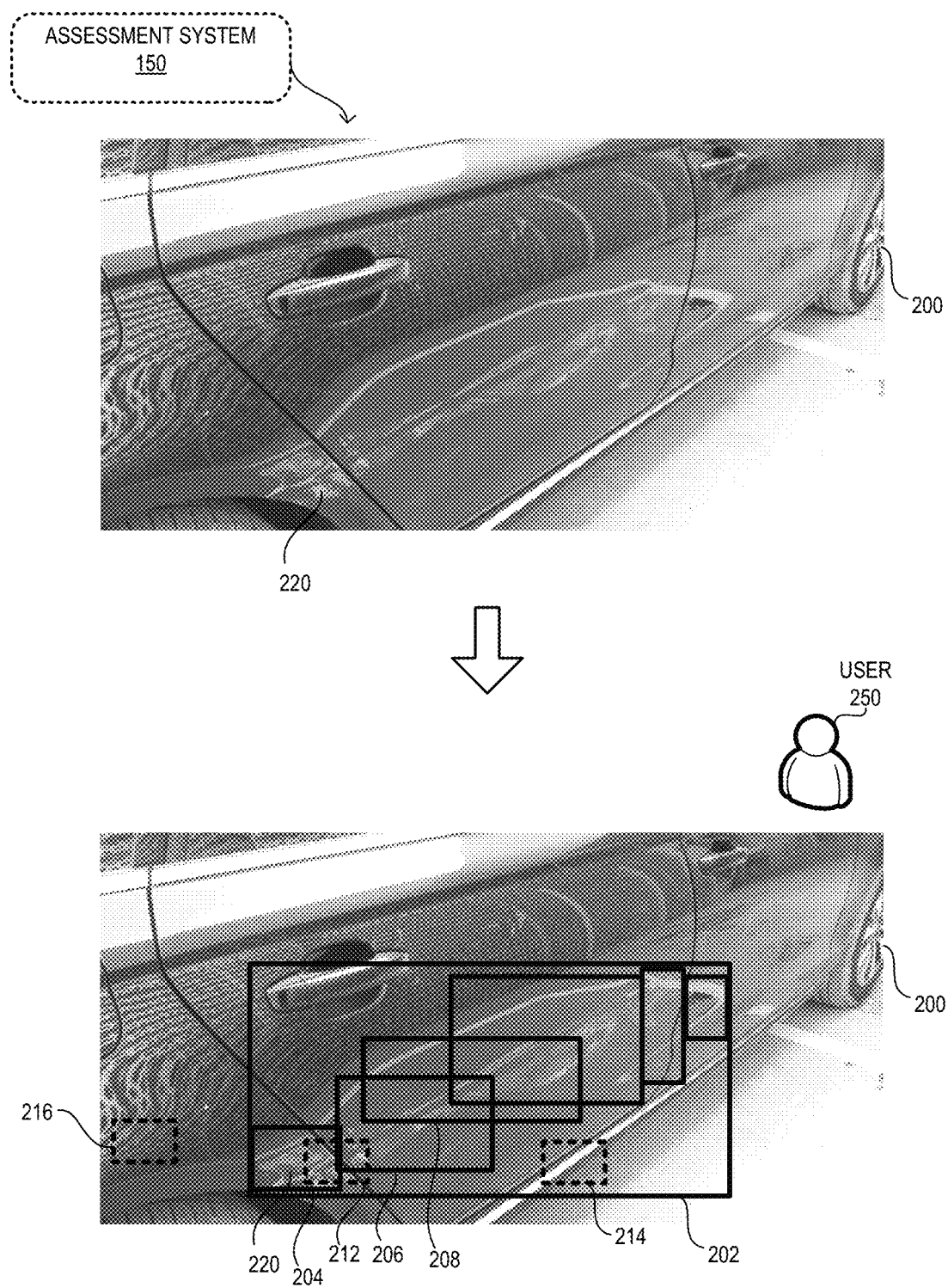
FIG. 2 illustrates exemplary bounding boxes for generating image samples for training a target detection system of an efficient assessment system, in accordance with an embodiment of the present application.

FIG. 2 illustrates exemplary bounding boxes for generating image samples for training a target detection system of an efficient assessment system, in accordance with an embodiment of the present application. During operation, system 150 can receive an input image 200 for image sampling. Image 200 may depict a vehicular damage 220 (i.e., damage on a vehicle). A user 250 may label image 200 with one or more bounding boxes. Each of the bounding boxes can correspond to a label that indicates a damage definition (i.e., the area of the damage and the class of damage). The bounding boxes include at least one target bounding box and may include a set of internal bounding boxes located in the target bounding box.

User 250 may determine the largest continuous region of damage 220 and apply a target bounding box 202 on the largest continuous region. Here, a target bounding box surrounds a continuous region of damage. User 250 may start from the largest continuous region for determining a target bounding box, and continue with the next largest continuous region for a subsequent target bounding box in the same image. User 250 can then select a part of the continuous region in bounding box 202 with an internal bounding box 204. In the same way, user 250 can select internal bounding boxes 206 and 208 in bounding box 202.

It should be noted that, even though a bounding box typically takes a square or rectangular shape, the bounding box may take any other shape, such a triangular or oval shape. In this example, shapes and sizes of internal bounding boxes 204, 206, and 208 may take the same or different forms. Furthermore, two adjacent bounding boxes may or may not be joined and/or overlapping. In addition, the internal bounding boxes within target bounding box 202 may or may not cover the continuous region of damage in its entirety.

During operation, system 150 can then determine region proposals for sampling in target bounding box 202. The region proposal can be placed in target bounding box 202 based on a sliding window or an image segmentation algorithm. For collecting a positive sample, system 150 may determine a region proposal 212 in a region covered by a portion of damage 220. System 150 compares region proposal 212 with corresponding internal bounding boxes 204 and 206 to determine overlapping parameters. Based on whether the overlapping parameters are in a threshold range, system 150 may collect region proposal 212 as a positive sample.

Otherwise, if the overlapping parameters are below a low threshold range, system 150 may collect region proposal 212 as a negative sample. In addition, system 150 can also determine a region proposal 214 in a region of target bounding box 202 that may not include damage 220 (e.g., using segmentation). System 150 can also determine a region proposal 216 outside of target bounding box 202 to collect a negative sample. In this way, system 150 can use region proposals 214 and 216 for negative samples, thereby ensuring that the corresponding negative samples do not include any damage information.

Figure 3A:
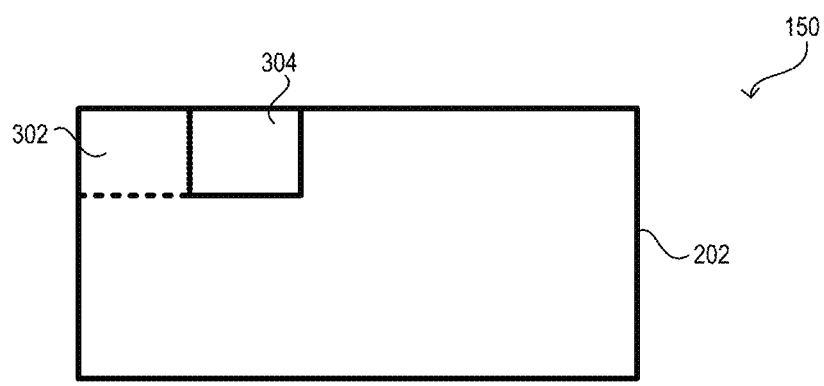
FIG. 3A illustrates an exemplary region proposal generation process for generating image samples, in accordance with an embodiment of the present application.

FIG. 3A illustrates an exemplary region proposal generation process for generating image samples, in accordance with an embodiment of the present application. System 150 may determine a set of movement rules that determines the placement of a region proposal in target bounding box 202. System 150 can also receive the movement rules as input. The movement rules can be defined so that, from a current region proposal, a subsequent region proposal can be determined within the region enclosed by target bounding box 202. Such rules can include an initial position of a region proposal (i.e., the position of a bounding box corresponding to the region proposal), the deviation distance from a previous position for a movement, and a movement direction, and a movement termination condition. The movement termination condition can be based on one or more of: a number of region proposals and/or movements in a target bounding box and the region covered by the region proposals (e.g., a threshold region).

Based on the movement rules, system 150 can determine a number of region proposals in target bounding box 202. In some embodiments, the upper left corner of target bounding box 202 is selected as the position for of the initial region proposal 302. The next region proposal 304 can be selected based on a movement from left to right along the left-to-right width of target bounding box 202. A predetermined step length can dictate how far region proposal 304 should be from region proposal 302. In this way, a sample can be generated for each movement.

In some further embodiments, the position of a region proposal in target bounding box 202 can be randomly selected. To do so, system 150 can randomly determine a reference point of region proposal 302 (e.g., a center or corner point of region proposal 302). The position of the reference point can be selected based on a movement range of the reference point (e.g., a certain distance between the reference point and the boundary of target bounding box 202 should be maintained). System 150 can then place region proposal 302 in target bounding box 202 based on a predetermined size of a region proposal with respect to the reference point.

Figure 3B:
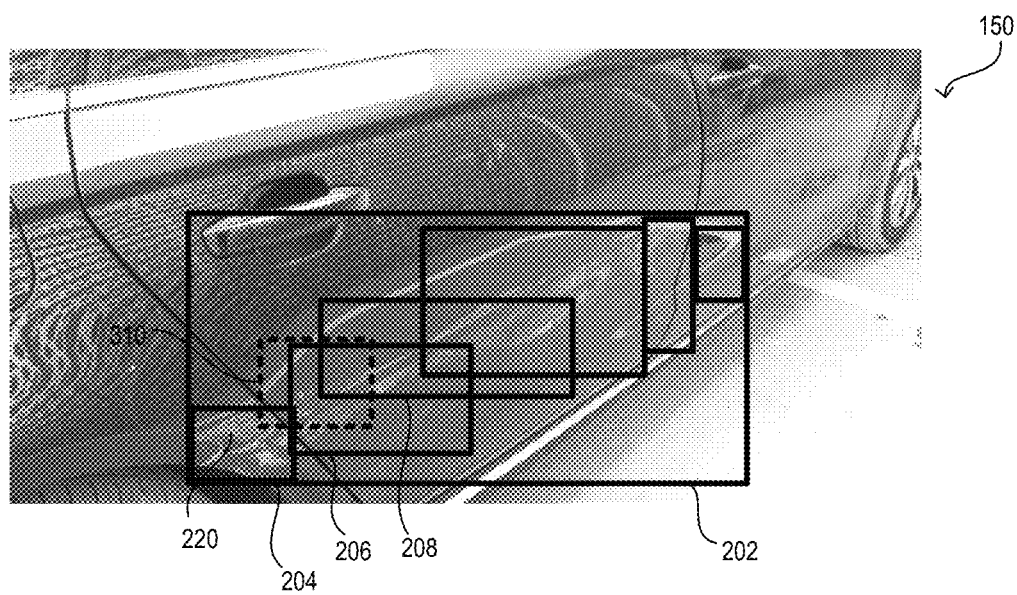
FIG. 3B illustrates an exemplary assessment of a region proposal for generating image samples, in accordance with an embodiment of the present application.

FIG. 3B illustrates an exemplary assessment of a region proposal for generating image samples, in accordance with an embodiment of the present application. Suppose that system 150 has determined a region proposal 310 in target bounding box 202. To assess region proposal 310, system 150 determines the overlapping parameters that indicate the degree and/or proportion of overlap between region proposal 310 and the region enclosed by a respective internal bounding box in target bounding box 202. Since parts of the continuous region of damage 220 are represented by the internal bounding boxes, a high degree of overlap between region proposal 310 and the internal bounding boxes indicates that region proposal 310 includes a significant portion of damage 220. Based on this assessment, system 150 can select region proposal 310 as a positive sample.

When system 150 performs image sampling in the region enclosed by target bounding box 202, system 150 may compare region proposal 310 with a respective internal bounding box of target bounding box 202. This comparison can be executed based on an arrangement order of the internal bounding boxes, or based on the distance to region proposal 310 (e.g., from near to far). In some embodiments, system 150 may compare region proposal 310 only with the internal bounding boxes in the vicinity of region proposal 310. For example, system 150 can compare region proposal 310 only with the internal bounding boxes that are within a predetermined threshold distance (e.g., within a 50-pixel distance) or, have an intersection with region proposal 310 (e.g., internal bounding boxes 204, 206, and 208). In this way, system 150 can significantly reduce the volume of data processing.

System 150 can determine whether region proposal 310 can be an image sample based on the overlapping parameters of region proposal 310 and a surrounding region. The surrounding region includes the total region enclosed by region proposal 310 and an internal bounding box that has been compared with region proposal 310. For example, if system 150 has compared region proposal 310 with internal bounding boxes 204, the surrounding region for region proposal 310 can be the region enclosed by internal bounding box 204 and region proposal 310. System 150 can then determine the overlapping parameters of region proposal 310 with respect to the internal region, and determine whether region proposal 310 can be an image sample. The overlapping parameters can indicate whether there is an overlapping, the overlapping degree, and the overlapping proportion.

Figure 3C:
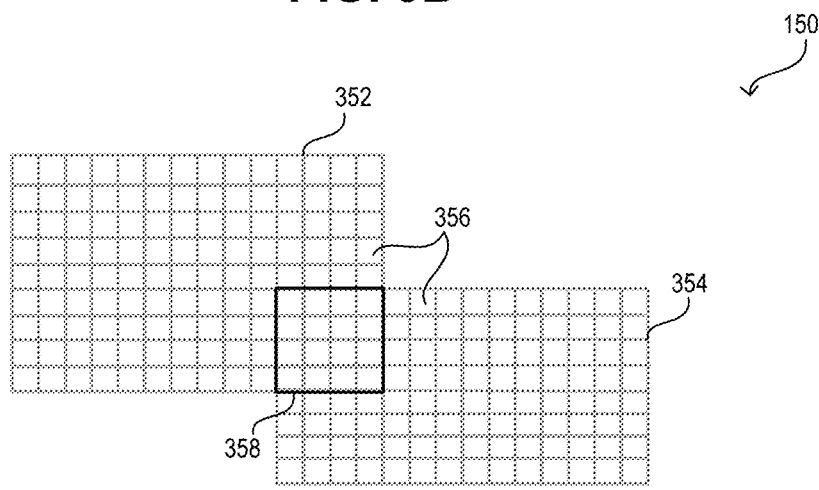
FIG. 3C illustrates an exemplary determination of whether a region proposal can be an image sample, in accordance with an embodiment of the present application.

FIG. 3C illustrates an exemplary determination of whether a region proposal can be an image sample, in accordance with an embodiment of the present application. In this example, system 150 determines whether a region proposal 354 can be selected as an image sample. System 150 can determine the surrounding region 356 (denoted with a gray grid) covered by internal bounding box 352 and region proposal 354. System 150 then determines the overlapping region 358 (denoted with a dark line) between region proposal 354 and internal bounding box 352. System 150 can then determine the overlapping parameters for internal bounding box 352 and region proposal 354 as a ratio of overlapping region 358 and surrounding region 356. In some embodiments, system 150 may determine the overlapping parameters for internal bounding box 352 and region proposal 354 as a ratio of overlapping region 358 and the region enclosed by internal bounding box 352.

In some embodiments, the ratio is determined based on an intersection over union (IoU) of the regions. If the regions are represented based on pixels, the ratio can be determined as the ratio of corresponding pixels. In the example in FIG. 3C, if one grid represents one pixel, the ratio can be calculated as pixels in overlapping region 358/pixels in surrounding region 356=16/122. If the ratio is larger than a predetermined threshold (e.g., 0.7) or falls within a threshold range (e.g., 0.7-0.99), system 150 can select the region proposal as a positive sample. If system 150 compares a region proposal with a plurality of internal bounding boxes, system 150 can generate a set of overlapping parameters. System 150 can select the region proposal as a positive sample if the largest value of the set of overlapping parameters is larger than a threshold or falls within a threshold range.

In some embodiments, the size and shape of the bounding box of a region proposal may be adjusted to obtain another bounding box. System 150 can then perform another round of sampling using the new bounding box. If there is another target bounding box in the image, system 150 can use the same method for image sampling in that target bounding box. In this way, system 150 can perform image sampling for each target bounding box in an image. Each target bounding box may allow system 150 to determine a plurality of region proposals for sampling. For each region proposal, system 150 can determine whether to select the region proposal as a positive sample for training a target detector.

Optionally, system 150 does not select a region proposal as a positive sample (i.e., the overlapping parameters have not met the condition), system 150 may further screen the region proposal as a potential negative sample. For example, system 150 may select the region proposal as a negative sample if the ratio of the region proposal for each corresponding internal bounding box is below a low threshold range (e.g., 0.1). In other words, if the comparison results of a region proposal and the regions enclosed by all corresponding internal bounding boxes meet the condition for a negative sample, system 150 can select the region proposals as a negative sample. Furthermore, system 150 can place a region proposal outside of any target bounding box to collect a negative sample. Since each continuous damage region is covered by a corresponding target bounding box, a region proposal outside of any target bounding box can be selected as a negative sample. In this way, system 150 can reduce noise interference in a negative sample.

Efficient Target Detector

Figure 4:
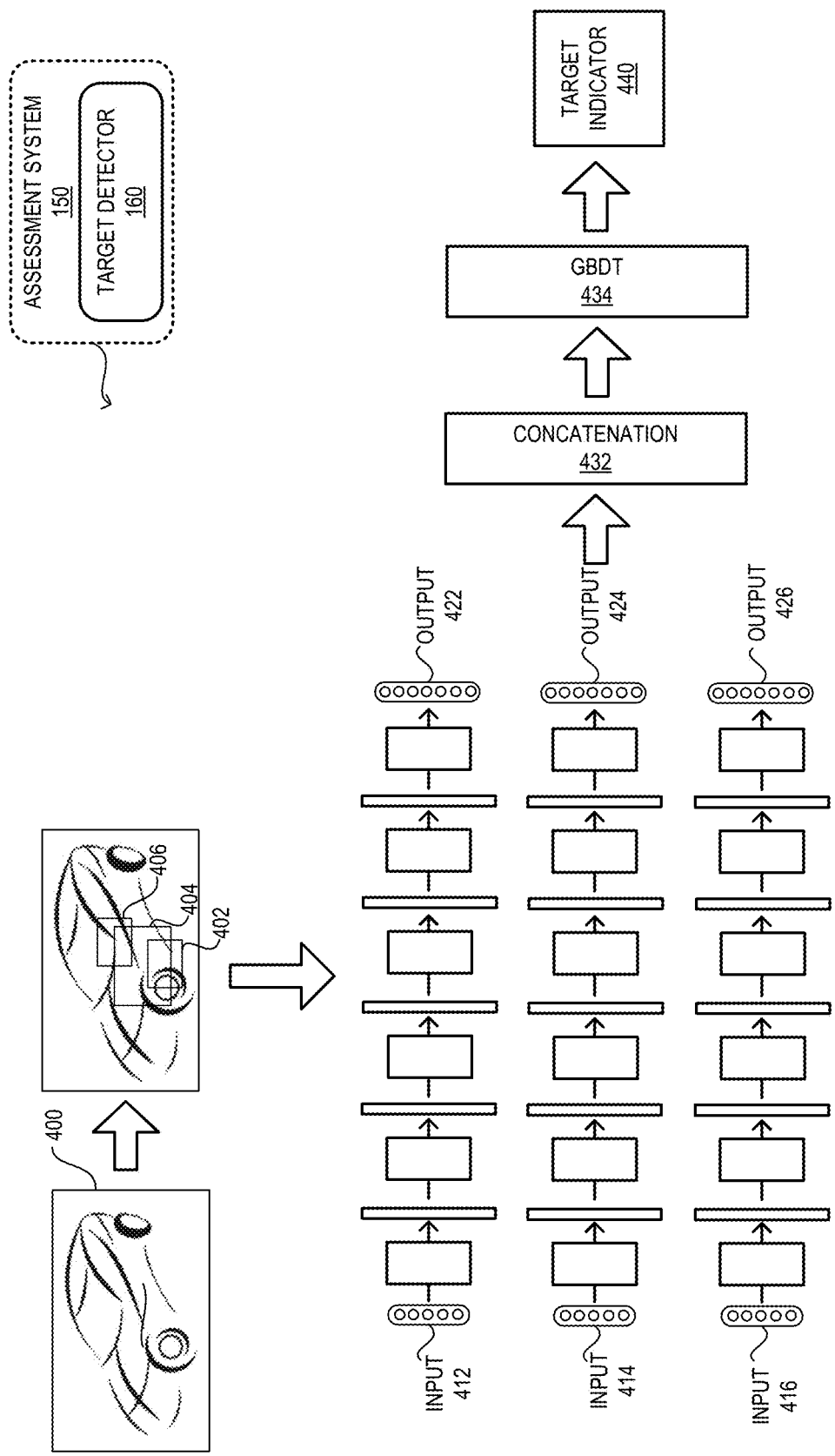
FIG. 4 illustrates an exemplary integration of detection results of multiple samples, in accordance with an embodiment of the present application.

FIG. 4 illustrates an exemplary integration of detection results of multiple samples, in accordance with an embodiment of the present application. Suppose that system 150 has obtained positive samples 402, 404, and 406 from an input image 400. System 150 can represent samples 402, 404, and 406 as inputs 412, 414, and 416, respectively, for target detector 160 of system 150. System 150 can use target detector 160 to generate corresponding outputs 422, 424, and 426. Each of these outputs can include a characteristic description of the corresponding input. The characteristic description can include a feature vector, a label (e.g., based on the damage class), and a corresponding bounding box.

System 150 can then construct a splice of outputs 422, 424, and 426 in the bounding box dimension. For example, system 150 can perform a concatenation 432 of the bounding boxes to improve the accuracy of target detector 160. Target detector 160 can be further trained and optimized based on a Gradient Boosted Decision Trees (GBDT) model 434. GBDT model 434 can optimize the concatenated bounding boxed and generate a corresponding target indicator 436, which can include an optimized bounding box and a corresponding label, for the damage depicted in samples 402, 404, and 406. In this way, the efficiency and accuracy of target detector 160 can be further improved.

Operations

Figure 5A:
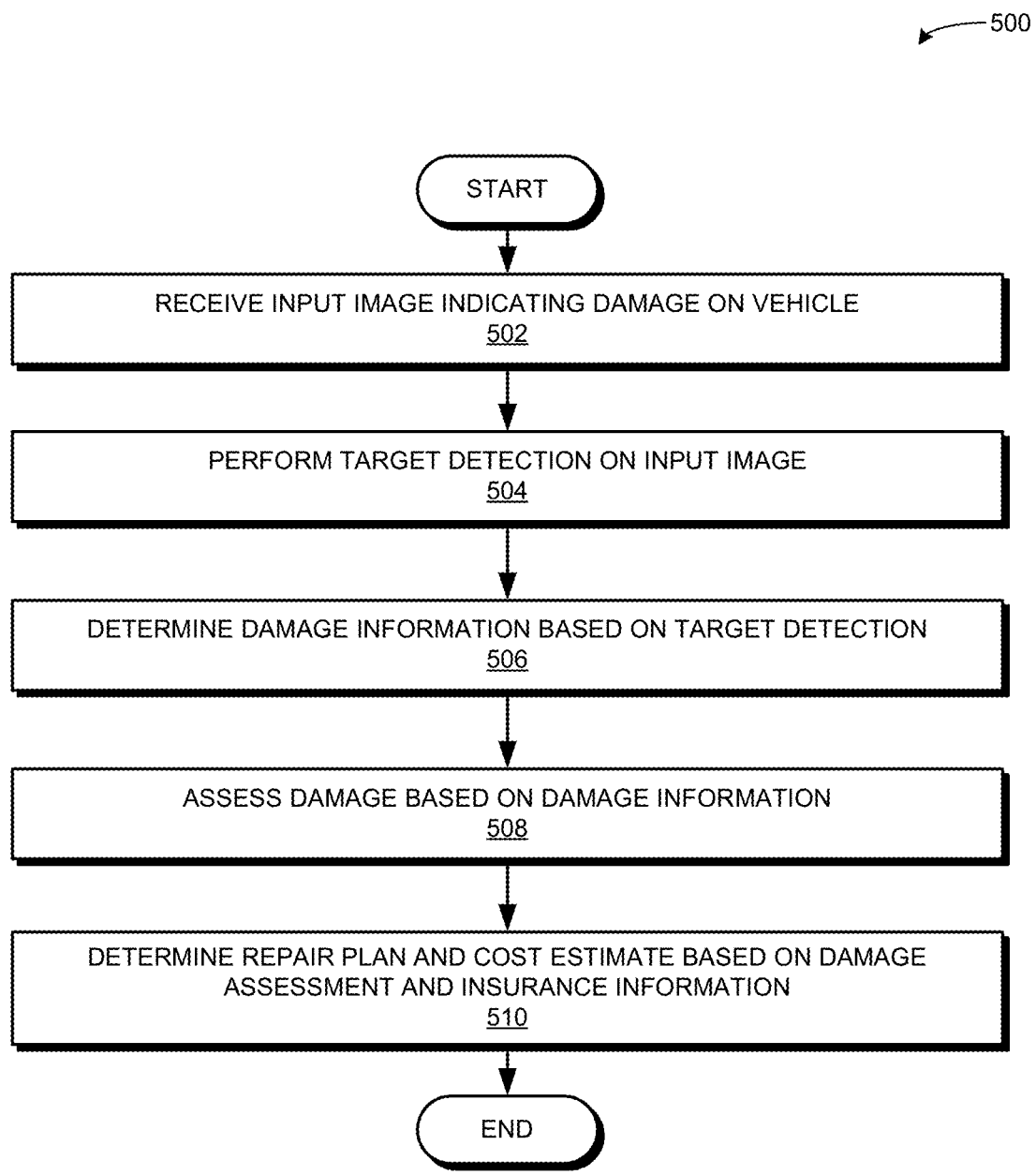
FIG. 5A presents a flowchart illustrating a method of an assessment system performing a damage assessment, in accordance with an embodiment of the present application.

FIG. 5A presents a flowchart 500 illustrating a method of an assessment system performing a damage assessment, in accordance with an embodiment of the present application. During operation, the system receives an input image indicating damage on a vehicle (operation 502) and performs target detection on the input image (operation 504). The system then determines the damage information (e.g., the degree of the damage and the parts impacted by the damage) based on the target detection (operation 506). The system assesses the damage based on the damage information (e.g., whether the parts can be repaired or would need replacement) (operation 508). Subsequently, the system determines a repair plan and cost estimate based on the damage assessment and insurance information (operation 510).

Figure 5B:
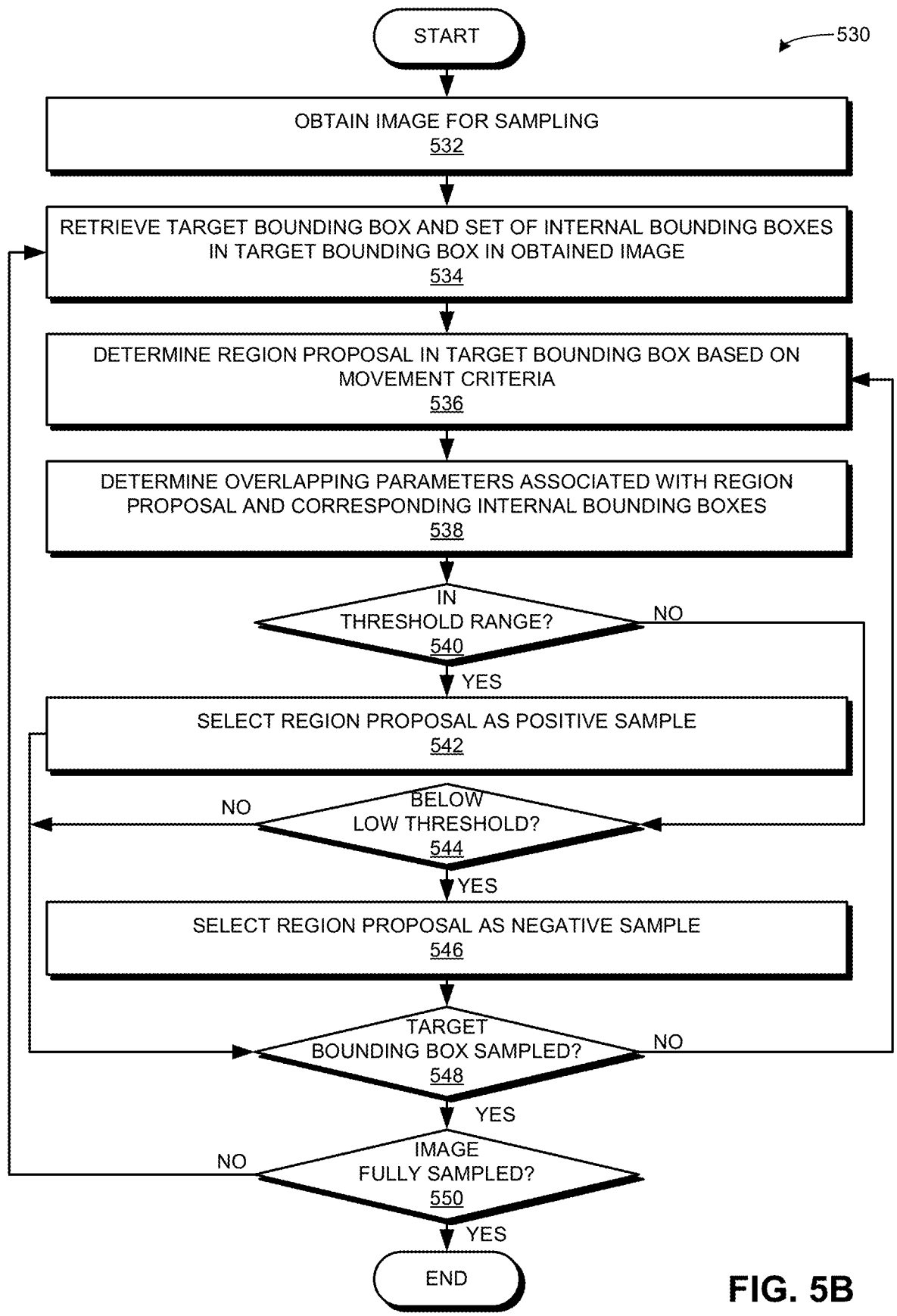
FIG. 5B presents a flowchart illustrating a method of an assessment system generating image samples for training a target detection system, in accordance with an embodiment of the present application.

FIG. 5B presents a flowchart 530 illustrating a method of an assessment system generating image samples for training a target detection system, in accordance with an embodiment of the present application. During operation, the system obtains an image for sampling (operation 532) and retrieves a target bounding box and a set of internal bounding boxes in the target bounding box in the obtained image (operation 534). The system then determines a region proposal in the target bounding box based on a set of movement criteria (operation 536) and determines overlapping parameters (e.g., IoUs) associated with the region proposal and the corresponding internal bounding boxes (operation 538).

Subsequently, the system determines whether the overlapping parameters are in the threshold range (operation 540). If the overlapping parameters are in the threshold range, the system can select the region proposal as a positive sample (operation 542). If the overlapping parameters are not in the threshold range, the system determines whether the overlapping parameters are below a low threshold range (operation 544). If the overlapping parameters are below a low threshold range, the system can select the region proposal as a negative sample (operation 546).

Upon selecting the region proposal as a sample (operation 542 or 546), or if the overlapping parameters are not below a low threshold range (operation 544), the system determines whether the target bounding box has been fully sampled (i.e., the set of movement criteria has met a termination condition) (operation 548). If the target bounding box has not been fully sampled, the system determines another region proposal in the target bounding box based on the set of movement criteria (operation 536). If the target bounding box has been fully sampled, the system determines whether the input image has been fully sampled (i.e., all target bounding boxes have been sampled) (operation 550). If the input image has not been fully sampled, the system retrieves another target bounding box and another set of internal bounding boxes in the target bounding box in the obtained image (operation 534).

Figure 5C:
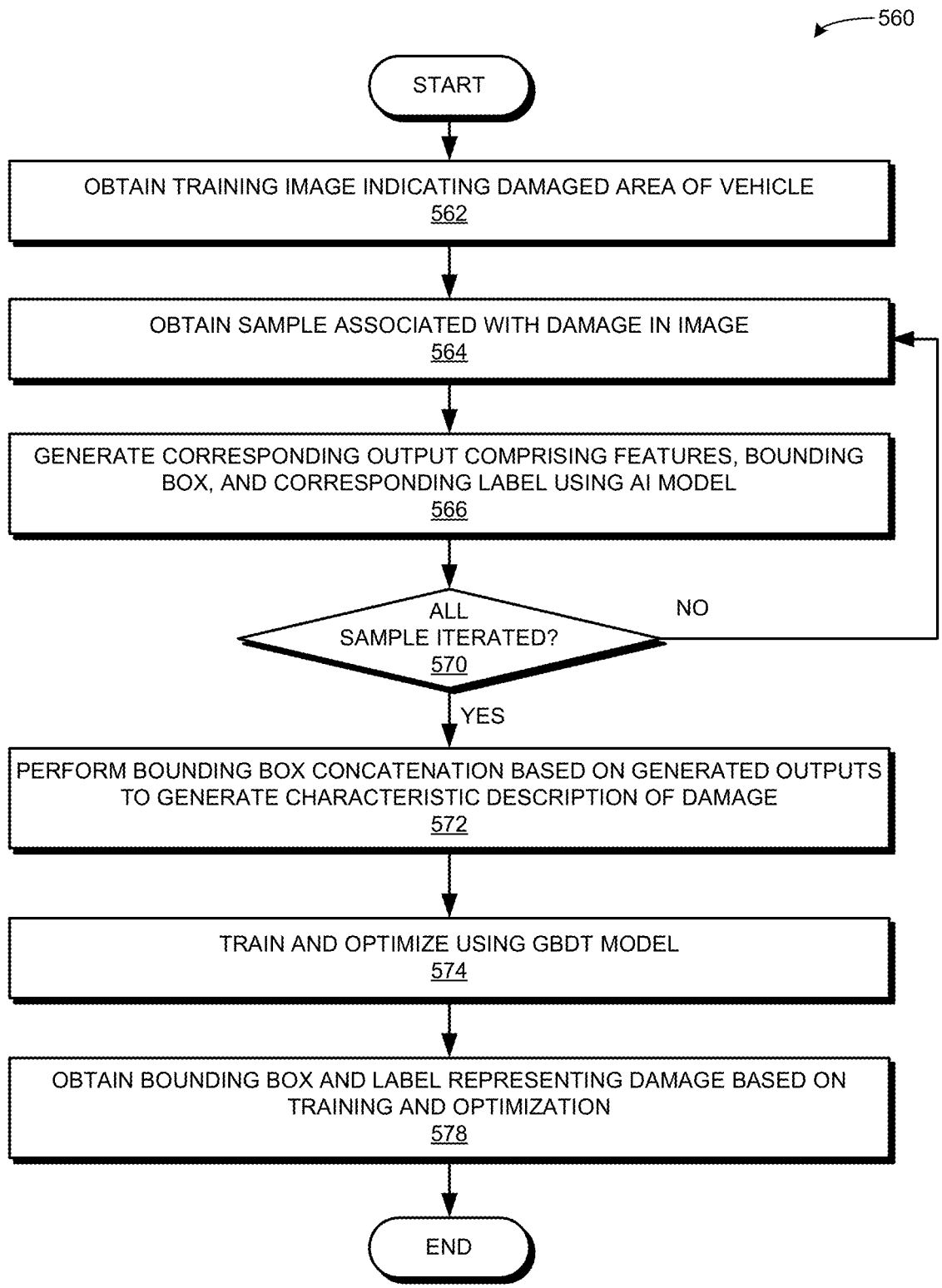
FIG. 5C presents a flowchart illustrating a method of an assessment system integrating detection results of multiple samples, in accordance with an embodiment of the present application.

FIG. 5C presents a flowchart 560 illustrating a method of an assessment system integrating detection results of multiple samples, in accordance with an embodiment of the present application. During operation, the system obtains a training image indicating a damaged area of a vehicle (i.e., a vehicular damage) (operation 562) and a sample associated with the damage in the image (operation 564). The system then generates corresponding output comprising features (e.g., a feature vector), a bounding box, and a corresponding label using an AI model (e.g., the target detector) (operation 566). The system then checks whether all samples are iterated (operation 570).

If all samples have not been iterated, the system continues to determine another sample associated with the damage in the image (operation 564). If all samples have been iterated, the system performs bounding box concatenation based on the generated outputs to generate a characteristic description of the damage (operation 572). The system then trains and optimizes using a GBDT model (operation 574) and obtains a bounding box and a corresponding label representing the damage based on the training and optimization (operation 576).

Exemplary Computer System and Apparatus

Figure 6:
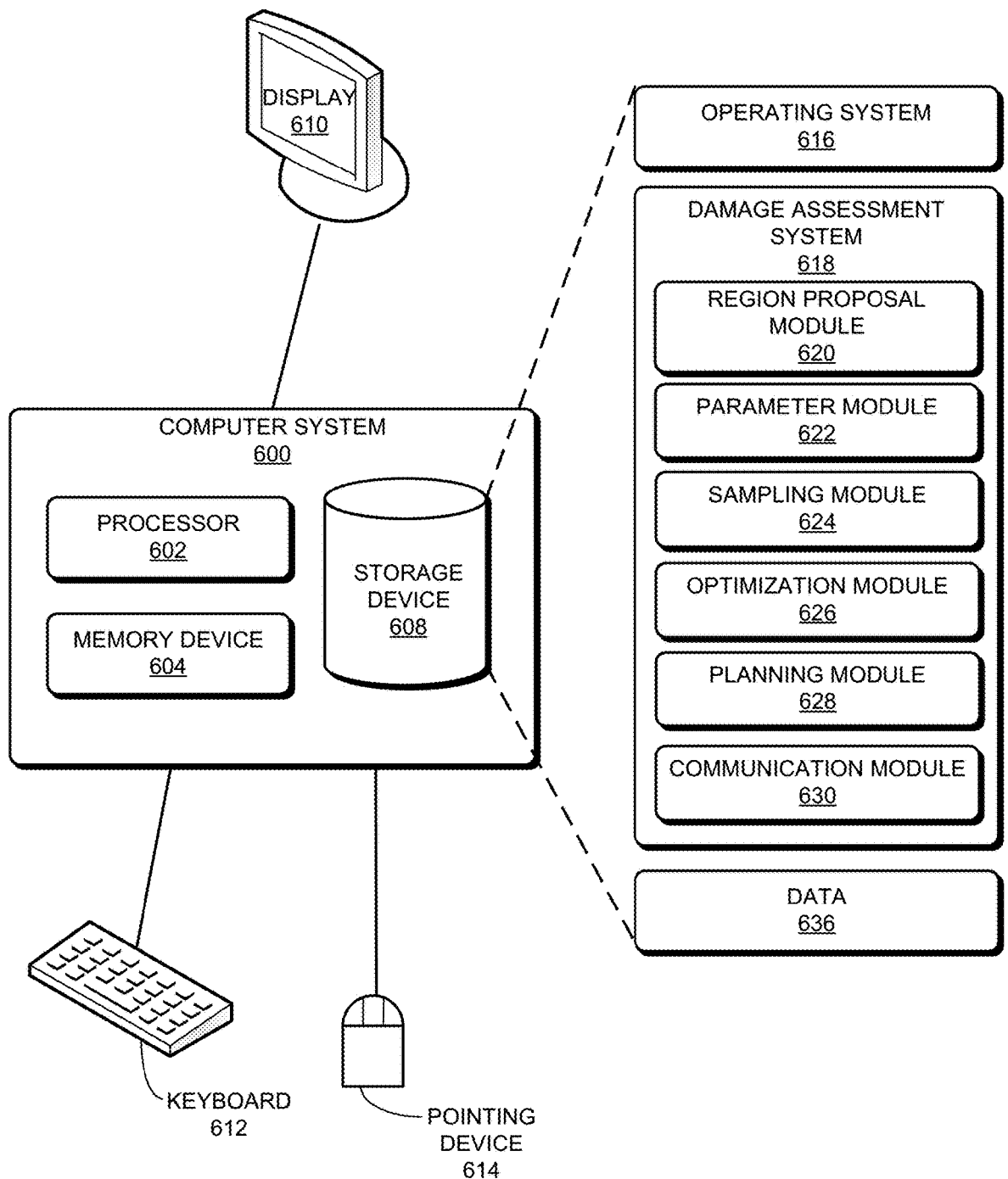
FIG. 6 illustrates an exemplary computer system that facilitates an efficient assessment system, in accordance with an embodiment of the present application.

FIG. 6 illustrates an exemplary computer system that facilitates an efficient assessment system, in accordance with an embodiment of the present application. Computer system 600 includes a processor 602, a memory device 604, and a storage device 608. Memory device 604 can include volatile memory (e.g., a dual in-line memory module (DIMM)). Furthermore, computer system 600 can be coupled to a display device 610, a keyboard 612, and a pointing device 614. Storage device 608 can be a hard disk drive (HDD) or a solid-state drive (SSD). Storage device 608 can store an operating system 616, a damage assessment system 618, and data 636. Damage assessment system 618 can facilitate the operations of system 150.

Damage assessment system 618 can include instructions, which when executed by computer system 600 can cause computer system 600 to perform methods and/or processes described in this disclosure. Specifically, damage assessment system 618 can include instructions for generating region proposals in a target bounding box of an input image (region proposal module 620). Damage assessment system 618 can also include instructions for calculating overlapping parameters for the region proposal (parameter module 622). Furthermore, damage assessment system 618 includes instructions for determining whether a region proposal can be a positive or a negative sample based on corresponding thresholds (sampling module 624).

Damage assessment system 618 can also include instructions for training and optimizing using a GBDT model (response module 626). Moreover, damage assessment system 618 includes instructions for assessing a damaged area (i.e., a target) of a vehicle from an input image and generating a repair plan (planning module 628). Damage assessment system 618 may further include instructions for sending and receiving messages (communication module 630). Data 636 can include any data that can facilitate the operations of damage assessment system 618, such as labeled images and generated samples.

Figure 7:
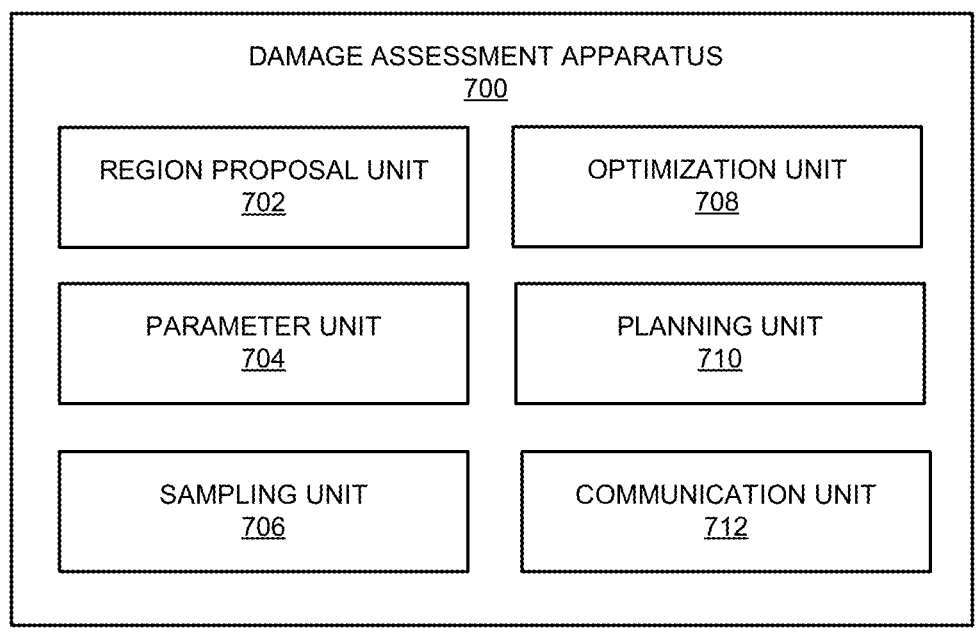
FIG. 7 illustrates an exemplary apparatus that facilitates an efficient assessment system, in accordance with an embodiment of the present application.

FIG. 7 illustrates an exemplary apparatus that facilitates an efficient assessment system, in accordance with an embodiment of the present application. Damage assessment apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can include units 702-712, which perform functions or operations similar to modules 620-630 of computer system 600 of FIG. 6, including: a region proposal unit 702; a parameter unit 704; a sampling unit 706; an optimization unit 708; a planning unit 710; and a communication unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating image sampling for training a target detector, comprising:
    obtaining a first image depicting a first target, wherein a continuous part of the first target depicted in the first image is labeled and enclosed by a target bounding box;
    determining region proposals from an area of the first image enclosed by the target bounding box;
    generating a set of positive image samples from a subset of the region proposals, wherein a respective region proposal of the subset of the region proposals is associated with an overlapping parameter in a threshold range, wherein a respective positive image sample of the set of positive image samples includes at least a part of the first target; and
    training the target detector with the set of positive image samples to detect a second target from a second image, wherein the target detector is an artificial intelligence (AI) model capable of detecting an object, and wherein the first and second targets indicate first and second vehicular damages, respectively.

2. The method of claim 1, wherein the label of the continuous part indicates a material impacted by the first vehicular damage.

3. The method of claim 2, wherein detecting the second target comprises detecting the second vehicular damage based on a corresponding material independent of identifying a part of a vehicle impacted by the second vehicular damage.

4. The method of claim 1, wherein the overlapping parameter is a ratio of an overlapping region of the respective region proposal and a surrounding region of the respective region proposal,
    wherein the overlapping region indicates a common region covered by both the respective region proposal and at least one internal bounding box of a set of internal bounding boxes within the target bounding box, wherein a respective internal bounding box of the set of internal bounding boxes includes at least a part of the continuous region, and
    wherein the surrounding region indicates a total region covered by the respective region proposal and the set of internal bounding boxes.

5. The method of claim 4, wherein the set of internal bounding boxes is determined for the respective region proposal based on one of:
    an intersection with the respective region proposal;
    a distance from the respective region proposal; and
    a total number of internal bounding boxes in the target bounding box.

6. The method of claim 1, further comprising generating a negative sample, which excludes any part of the first target, from the first image by one or more of:
    selecting a region proposal from a second subset of the region proposals as the negative sample, wherein the overlapping parameter of a respective region proposal of the second subset of the region proposals is in a low threshold range; and
    selecting an area outside of the target bounding box as the negative sample.

7. The method of claim 1, wherein the region proposals are determined based on applying a movement rule.

8. The method of claim 1, further comprising generating a second set of positive image samples from one or more of:
    new region proposals from an area of the first image enclosed by a second target bounding box in the first image; and
    new region proposals with a different size or shape compared to the region proposals.

9. The method of claim 1, further comprising optimizing the training of the target detector by:
    generating a plurality of bounding boxes for a plurality of image samples in the set of positive image samples, wherein a respective bounding box identifies the corresponding part of the continuous region; and
    combining the plurality of bounding boxes to generate a combined bounding box and a corresponding label.

10. A non-transitory computer-readable storage medium storing instructions that when executed by a computer, cause the computer to perform a method for facilitating image sampling for training a target detector, the method comprising:
    obtaining a first image depicting a first target, wherein a continuous part of the first target depicted in the first image is labeled and enclosed by a target bounding box;

determining region proposals from an area of the first image enclosed by the target bounding box;

generating a set of positive image samples from a subset of the region proposals, wherein a respective region proposal of the subset of the region proposals is associated with an overlapping parameter in a threshold range, wherein a respective positive image sample of the set of positive image samples includes at least a part of the first target; and training the target detector with the set of positive image samples to detect a second target from a second image, wherein the target detector is an artificial intelligence (AI) model capable of detecting an object, and wherein the first and second targets indicate first and second vehicular damages, respectively.

11. The non-transitory computer-readable storage medium of claim 10, wherein the label of the continuous part indicates a material impacted by the first vehicular damage.

12. The non-transitory computer-readable storage medium of claim 11, wherein detecting the second target comprises detecting the second vehicular damage based on a corresponding material independent of identifying a part of a vehicle impacted by the second vehicular damage.

13. The non-transitory computer-readable storage medium of claim 10, wherein the overlapping parameter is a ratio of an overlapping region of the respective region proposal and a surrounding region of the respective region proposal, wherein the overlapping region indicates a common region covered by both the respective region proposal and at least one internal bounding box of a set of internal bounding boxes within the target bounding box, wherein a respective internal bounding box of the set of internal bounding boxes includes at least a part of the continuous region, and wherein the surrounding region indicates a total region covered by the respective region proposal and the set of internal bounding boxes.

14. The non-transitory computer-readable storage medium of claim 13, wherein the set of internal bounding boxes is determined for the respective region proposal based on one of:

an intersection with the respective region proposal;
a distance from the respective region proposal; and
a total number of internal bounding boxes in the target bounding box.

15. The non-transitory computer-readable storage medium of claim 10, wherein the method further comprises generating a negative sample, which excludes any part of the first target, from the first image by one or more of:

selecting a region proposal from a second subset of the region proposals as the negative sample, wherein the overlapping parameter of a respective region proposal of the second subset of the region proposals is in a low threshold range; and selecting an area outside of the target bounding box as the negative sample.

16. The non-transitory computer-readable storage medium of claim 10, wherein the region proposals are determined based on applying a movement rule.

17. The non-transitory computer-readable storage medium of claim 10, wherein the method further comprises generating a second set of positive image samples from one or more of:

new region proposals from an area of the first image enclosed by a second target bounding box in the first image; and new region proposals with a different size or shape compared to the region proposals.

18. The non-transitory computer-readable storage medium of claim 10, wherein the method further comprises optimizing the training of the target detector by:

generating a plurality of bounding boxes for a plurality of image samples in the set of positive image samples, wherein a respective bounding box identifies the corresponding part of the continuous region; and combining the plurality of bounding boxes to generate a combined bounding box and a corresponding label.

* * * * *